United States Patent [19]
Kumagai et al.

[11] Patent Number: 5,515,222
[45] Date of Patent: May 7, 1996

[54] MAGNETIC HEAD CORE ARRANGEMENT HAVING MEDIUM FACING SURFACE SIDES FORMED OF SINGLE-CRYSTAL FERRITE

[75] Inventors: Seiji Kumagai; Junichi Honda; Yoshitomo Ito, all of Miyagi; Masatoshi Hayakawa, Kanagawa; Toru Matsunaga, Miyagi; Mineo Yorizumi, Miyagi; Yoshito Ikeda, Miyagi, all of Japan

[73] Assignee: Sony Corporation, Tokyo, Japan

[21] Appl. No.: 235,798

[22] Filed: Apr. 29, 1994

[30] Foreign Application Priority Data

Apr. 30, 1993 [JP] Japan ................................ 5-124685

[51] Int. Cl.$^6$ ..................... G11B 5/187; G11B 5/127; G11B 5/133
[52] U.S. Cl. ..................... 360/127; 360/122; 360/125
[58] Field of Search ..................... 360/122, 125, 360/127

[56] References Cited

U.S. PATENT DOCUMENTS

| | | | |
|---|---|---|---|
| 3,810,245 | 5/1974 | Ozawa et al. | 360/127 |
| 4,819,113 | 4/1989 | Kubota et al. | 360/126 |
| 5,043,842 | 8/1991 | Terada et al. | 360/119 |
| 5,233,492 | 8/1993 | Iwata et al. | 360/103 |

FOREIGN PATENT DOCUMENTS

| | | | |
|---|---|---|---|
| 2231191 | 1/1973 | Germany | 360/127 |

OTHER PUBLICATIONS

"Knoop Hardness Anisotropy . . . " by Ito, Journal of the American Ceramic Society vol. 54, No. 1, Jan. 1971, pp. 24–26.

Japan–Publication No. JP2061808, Aug. 29, 1988, Sony Corp.–"Composite Type Magnetic Head–Includes Mono and Polycrystalline Ferrite Sliding and Circuit Forming Parts and Intermediate Magnetic Oxide Film".

Japan–Publication No. JP4023210, May 18, 1990, Victor Co. of Japan–"Magnetic Head With Improved Resolution".

Patent Abstracts of Japan, vol. 3, No. 155, Dec. 19, 1979, Yoshikatsu Takeoka, "Magnetic Head".

Patent Abstracts of Japan, Jul. 15, 1982, vol. 6, No. 129 Takayuki Kumasaka, "Composite Magnetic Head".

Pagent Abstracts of Japan, Publication No. JP3156709, Publication Date Apr. 7, 1991, Hitoshi Iwata et al, "Floating Type Magnetic Head".

8012 S.M.P.T.E. Journal, vol. 92, (1993) Dec., No. 12, Hiroshi Tanimura et al, "A Second Generation Type–C One–Inch VTR".

Primary Examiner—A. J. Heinz
Assistant Examiner—Adriana Giordana
Attorney, Agent, or Firm—Hill, Steadman & Simpson

[57] ABSTRACT

In a magnetic head having a pair of magnetic cores defining a magnetic gap in-between, a side of each magnetic core facing a recording medium is formed of a single-crystal ferrite, with the remaining portions of each magnetic core being formed of poly-crystal ferrite. The surface of the magnetic core facing the recording medium and the abutment surface of the magnetic core are the {100} plane and the {100} plane of the single-crystal ferrite, respectively. The magnetic head has excellent abrasion resistance and electro-magnetic conversion characteristics.

4 Claims, 13 Drawing Sheets

MAGNETIC HEAD CORE ARRANGEMENT HAVING MEDIUM FACING SURFACE SIDES FORMED OF SINGLE-CRYSTAL FERRITE

BACKGROUND OF THE INVENTION

This invention relates to a magnetic head incorporated into a magnetic recording/reproducing apparatus, such as a VTR or a data storage device.

In the magnetic head, incorporated into the magnetic recording/reproducing apparatus, such as the VTR or the data storage device, a magnetic material formed of single-crystal ferrite is commonly employed as the material constituting a magnetic core.

The magnetic head is made up of magnetic core halves 81, 82, facing each other via a front gap $g_7$ and a back gap $g_8$ as a boundary and abutted and bonded to each other, as shown in FIG. 12. Each of the magnetic cores 81, 82 is formed of single-crystal ferrite. Track width suppression grooves 83, 84 are provided on the junction surfaces of the magnetic cores 81, 82 for restricting the track width of the magnetic gap $g_7$.

Fused glass 87 is charged in the fused state in the track width suppressing grooves 83, 84 for bonding the magnetic cores 81, 82 together. Coil winding slots 89, 90 and winding guide slots 91, 92 are formed on the abutment surfaces and on the lateral surfaces of the magnetic cores 81, 82 so that coils, not shown, may be placed and wound via the coil winding slots 89, 90.

With the above-described magnetic heads, single-crystal ferrite is extensively used as the constituent material for the magnetic core. However, if the single-crystal ferrite is used, the ultimate magnetic head is changed significantly in abrasion resistance or electro-magnetic characteristics due to the difference in the orientation of the slicing surface.

Consequently, the selection of the crystal orientation is crucial when slicing a magnetic head from an ingot of the single-crystal ferrite. For example, with the use of the Mn—Zn single-crystal ferrite, there have hitherto been known a β ferrite head having, for a surface facing the recording medium (medium facing surface), an abutting surface and a lateral surface, the planes {110}, {100} and {110}, and a J ferrite head having, for the medium facing surface, the abutting surface and the lateral surface, the {211}, {111} and {110} planes, respectively.

However, the β and J ferrite heads have their own merits and demerits. That is, since the {211} plane is not satisfactory in abrasion resistance, as shown for example in FIG. 13, the magnetic head formed of J ferrite has a drawback that it is not satisfactory with respect to the abrasion resistance. On the other hand, with the magnetic heads which are extensively used in the VHS system, the electro-magnetic conversion characteristics of the magnetic head formed of J ferrite are a little better than those of the magnetic head formed of β ferrite, such that it is extremely difficult to optimize the abrasion resistance and the electro-magnetic conversion characteristics simultaneously.

If the surface not satisfactory in abrasion resistance is used as the medium facing surface, as with the above-described J ferrite head, it may be contemplated to increase the depth length of the magnetic gap for assuring the service life of the magnetic head product. However, if the depth length is increased, the magnetic core efficiency of the magnetic head and also the electro-magnetic conversion characteristics are lowered.

SUMMARY OF THE INVENTION

It is therefore an object of the present invention to provide a magnetic head superior in abrasion resistance and electro-magnetic conversion characteristics and having long service life.

As a result of their eager searches towards accomplishing the above object, the present inventors have found that, by constituting the medium facing surface of the magnetic core by single-crystal ferrite and the remaining portion thereof by poly-crystal ferrite, and by controlling the plane orientation of the single-crystal ferrite, a magnetic head having excellent abrasion resistance and electro-magnetic conversion characteristics may be produced.

Thus the present invention provides a magnetic head having a pair of magnetic cores abutted together for defining a magnetic gap therebetween, wherein the top medium facing surfaces of the magnetic cores are formed of single-crystal ferrite and the remaining portions of the magnetic cores are formed of poly-crystal ferrite, with the top medium facing surfaces and the vertical abutment surfaces of the magnetic core defining the gap being the {100} plane and another {100} plane of the single-crystal ferrite, respectively.

Since the {100} planes of the single-crystal ferrite are superior in abrasion resistance, the abrasion caused by the rubbing of the recording medium may be suppressed and hence the service life of the magnetic head may be prolonged by employing the {100} planes as the surface facing the recording medium.

If the top medium facing surface is the {100} plane, deterioration in the electro-magnetic conversion characteristics may be feared. However, since the major portions of the magnetic core are constituted by poly-crystal ferrite, the deterioration in the electro-magnetic conversion characteristics ascribable to the crystal orientation of the single-crystal ferrite disposed towards the medium facing surface may be minimized, while the rubbing noise may be simultaneously lowered.

In addition, since the medium facing surface of the magnetic core is the {100} plane of the single-crystal ferrite and hence is superior in abrasion resistance, it becomes possible to reduce the depth length of the magnetic gap thereby improving the core efficiency and the electro-magnetic conversion characteristics of the magnetic head.

Furthermore, if the magnetic head of the present invention is loaded on a magnetic recording/reproducing apparatus, such as a VTR or a data storage device, the operating reliability of the magnetic recording/reproducing apparatus may be improved and recording may be made with a higher recording density.

BRIEF DESCRIPTION OF THE DRAWINGS

FIG. 2 is a perspective view showing the step of forming a bonded ferrite block.

FIG. 3 is a perspective view showing the step of forming a track width suppression groove in the bonded ferrite block.

FIG. 4 is a perspective view showing the step of forming a winding slot and a glass slot in the bonded ferrite block.

FIG. 5 is a perspective view showing the step of stacking a pair of bonded ferrite blocks.

DETAILED DESCRIPTION

Figure 1:
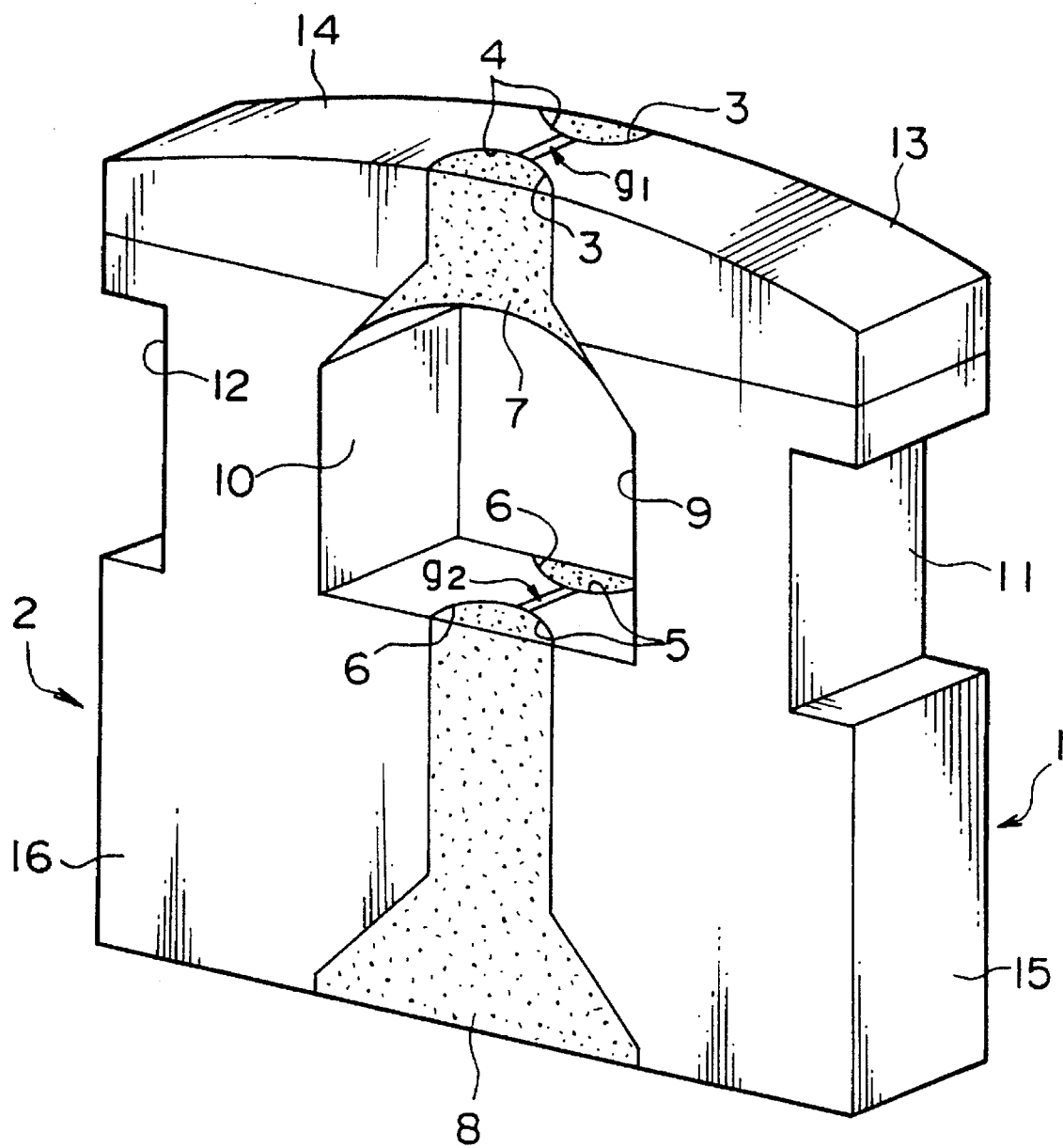
FIG. 1 is a perspective view showing a magnetic head of an embodiment 1 according to the present invention.

In magnetic recording/reproducing apparatus, such as VTR or data storage, investigations in high density recording or short wavelength recording are proceeding and, for keeping therewith, the high coercivity magnetic recording medium is being used in increasing numbers. In order to accommodate for this, a variety of magnetic heads employing magnetic metal materials have been developed. Typical of these magnetic heads are a metal-in-gap (MIG) head and a tilted sendust sputtered (TSS) head.

With the MIG head, the magnetic core is made up of an oxide substrate of, for example, a single-crystal ferrite, and a magnetic metal material. A thin magnetic metal film is formed on the vertical abutting surface of the magnetic core along its profile and the magnetic gap is formed by vertical abutting surface portions of the thin magnetic metal layers. The TSS head, on the other hand, has its magnetic core similarly constituted by a substrate formed of an oxide, such as single-crystal ferrite, and a magnetic metal material. A cut-out groove is formed in the vertical abutting surfaces of the magnetic cores and the thin magnetic films are formed at a pre-set angle on the vertical abutting surfaces, these thin magnetic metal films being abutted together for defining the magnetic gap therebetween.

The present invention may be applied to the MIG heads or the TSS heads according to the second embodiment and the third embodiment of the present invention, respectively.

With the magnetic head of the second embodiment of the present invention, thin magnetic metal films are formed on vertical abutment surfaces of the magnetic cores and the magnetic gap is formed by abutting the magnetic metal films together.

With the magnetic head of the third embodiment of the present invention, a cut-out groove is formed in the abutment surfaces of the magnetic cores at a pre-set angle with respect to the abutment surfaces, and thin magnetic metal films are formed in the cut-out groove and abutted together to form the magnetic gap therebetween.

PREFERRED EMBODIMENTS

Referring to the drawings, preferred embodiments of the present invention will be explained in detail.

Embodiment 1

The present embodiment is directed to a usual ferrite head having its magnetic core formed of ferrite.

The magnetic head of the present embodiment is made up of a pair of magnetic cores 1 and 2 abutted and connected to each other with a magnetic gap $g_1$ (front gap) and a magnetic gap $g_2$ (back gap) in-between, as shown in FIG. 1. Meanwhile, track width suppression grooves 3, 4 for restricting the track width of the magnetic gap $g_1$ and track width suppression grooves 5, 6 for restricting the track width of the magnetic gap $g_2$ are formed in the vertical abutment surfaces of the magnetic cores 1 and 2.

Fused glass is charged in a molten state between the track width suppression grooves 3, 4 and the track width suppression grooves 5, 6 for connecting the magnetic cores 1 and 2 together. There is no limitation to the fused glass if it is fused glass as is commonly employed for the manufacture of the magnetic heads. Coil winding slots 9, 10 and winding guide slots 11, 12 are formed in the abutting sides and in the lateral sides of the magnetic cores 1 and 2. Coils, not shown, are wound across the winding slots 11, 12 and the guide slots 9, 10.

With the magnetic head of the present embodiment, the top medium facing surfaces of the magnetic cores 1 and 2 are formed by respective layers of single-crystal ferrites 13, 14, with the remaining portions of the magnetic cores 1 and 2 being formed of poly-crystal ferrites 15, 16. The single-crystal ferrite is sliced so that the medium facing top surface is a (100) plane and the vertical abutment surface at the gap is also another (100) plane.

Figure 2:
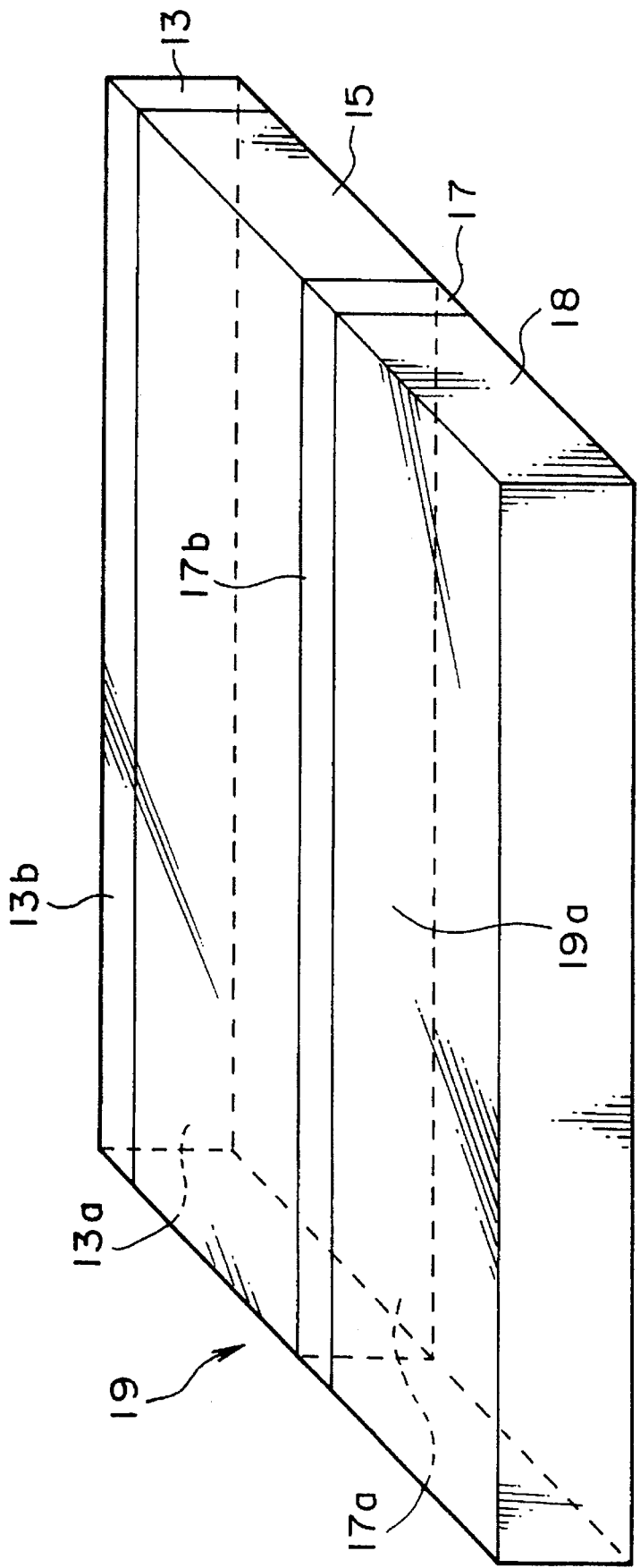
FIGS. 2 to 5 show the method for producing the magnetic head of the embodiment 1, step by step, where

The magnetic head of the present embodiment is fabricated by the following process steps. First, plate-shaped single-crystal ferrites 13, 17, sliced in a pre-set plane orientation, are arrayed in alternating fashion with plate-shaped poly-crystal ferrites 15, 18 and bonded together to form a bonded ferrite block 19, as shown in FIG. 2. A gap-forming surface 19a of the bonded ferrite block 19 is then polished to a mirror finish. The single-crystal ferrites 13, 17 are so set that the medium facing surfaces 13a and 17a and the abutting surfaces 13b and 17b are (100) plane and the (100) planes, respectively.

Figure 3:
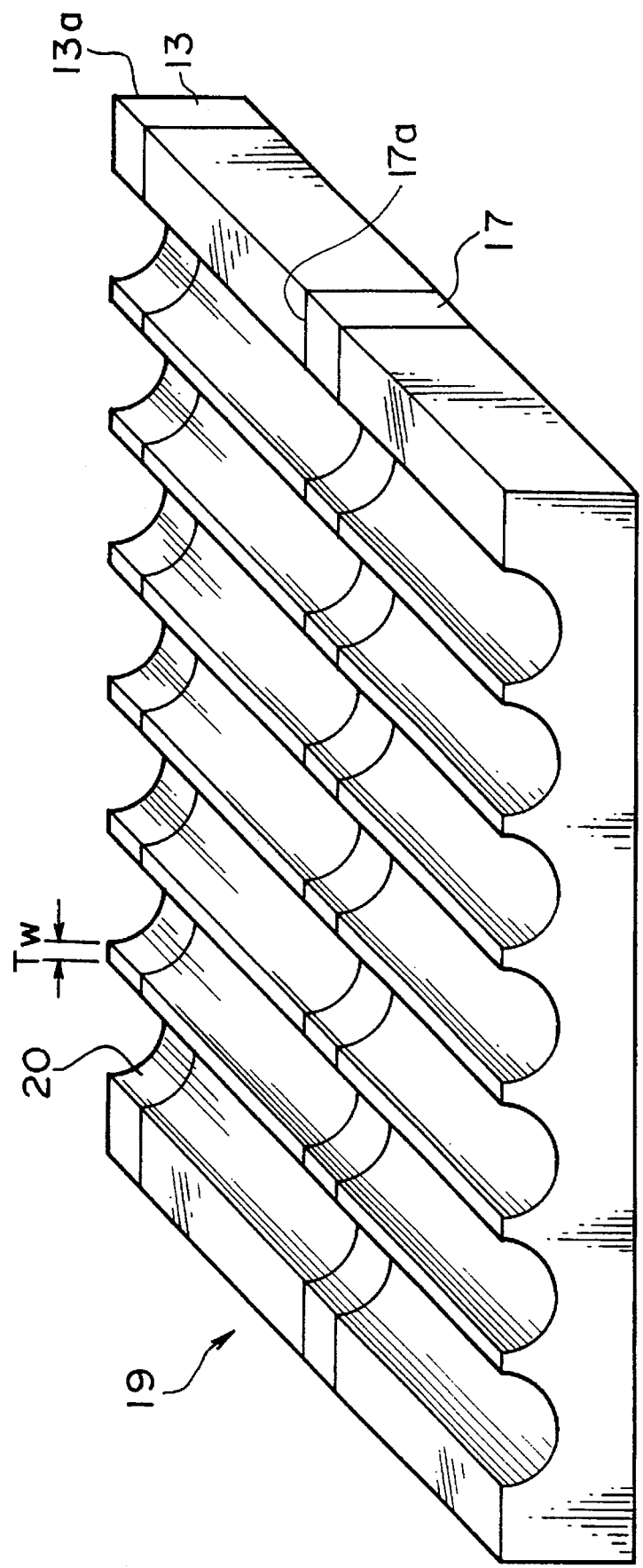

Then, a plurality of track width suppression grooves 20 of arcuate cross-sectional shape, delimiting a track width $T_W$ of the magnetic gap of the magnetic head, are formed at a pre-set track pitch on the bonded ferrite block 19 at right angles to the medium facing surfaces 13a, 17a, as shown in FIG. 3. That is, a land having a track width $T_W$ is formed between neighboring ones of the track width control grooves 20.

Figure 4:
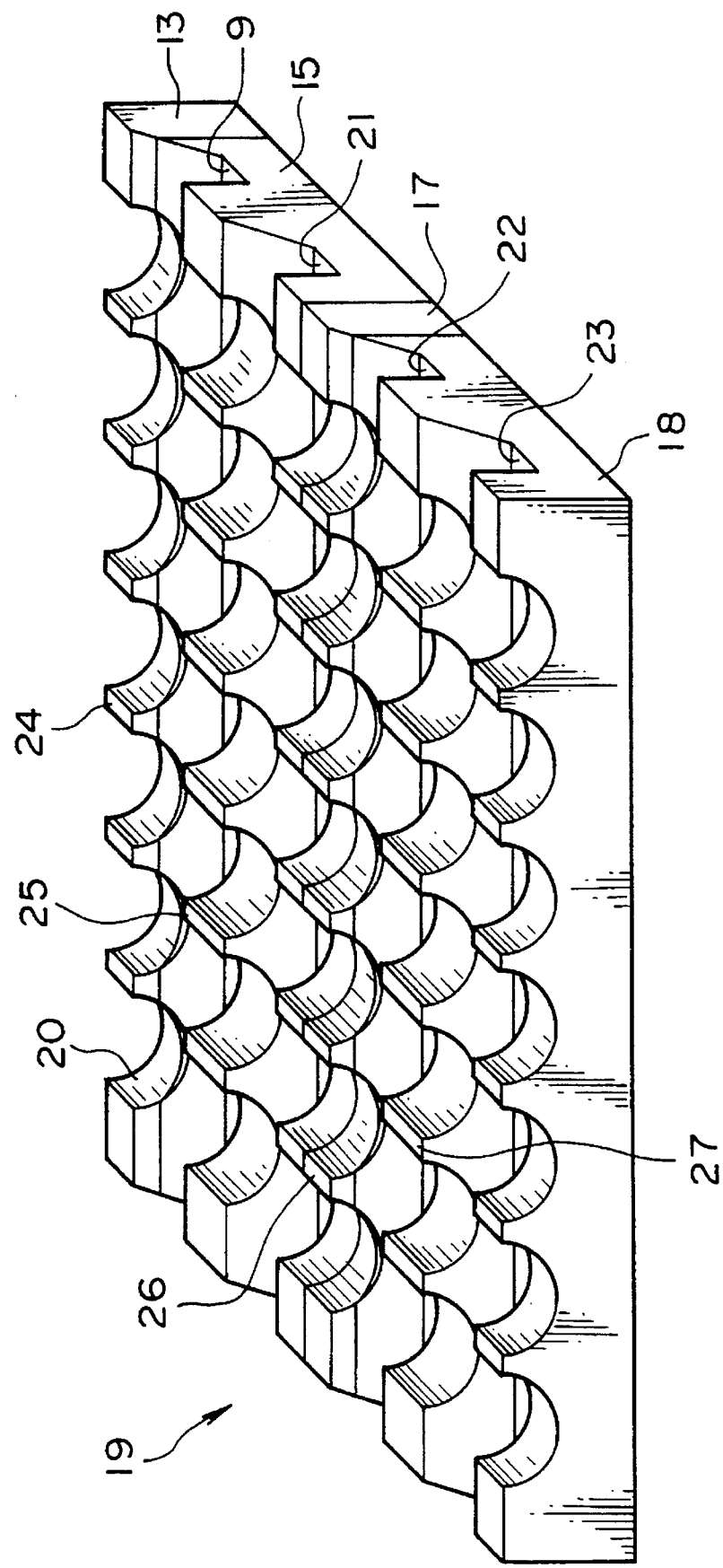

Then, winding slots 9, 22 and glass slots 21, 23 are formed at right angles to the track width control grooves 20 in the bonded ferrite block 19, as shown in FIG. 4. The winding slots 9, 22 are each in the form of a frustum and designed to be used for placing the coils therein. The bottom of the winding slots 9, 22 is the coil winding surface, and the distal end of the inclined surface delimits the magnetic gap depth. The winding slots 21, 23 are each in the form of a frustum and are designed to be used for glass fusion in the course of a subsequent process step for assuring bonding of the bonded ferrite block 19 to another bonded ferrite block which is formed similarly to the bonded ferrite block 19. Front gap forming surfaces 24, 28 and back gap forming surfaces 25, 27 are now defined by forming the track width suppression grooves 20, winding slots 9, 22 and the glass slots 21, 23.

Figure 5:
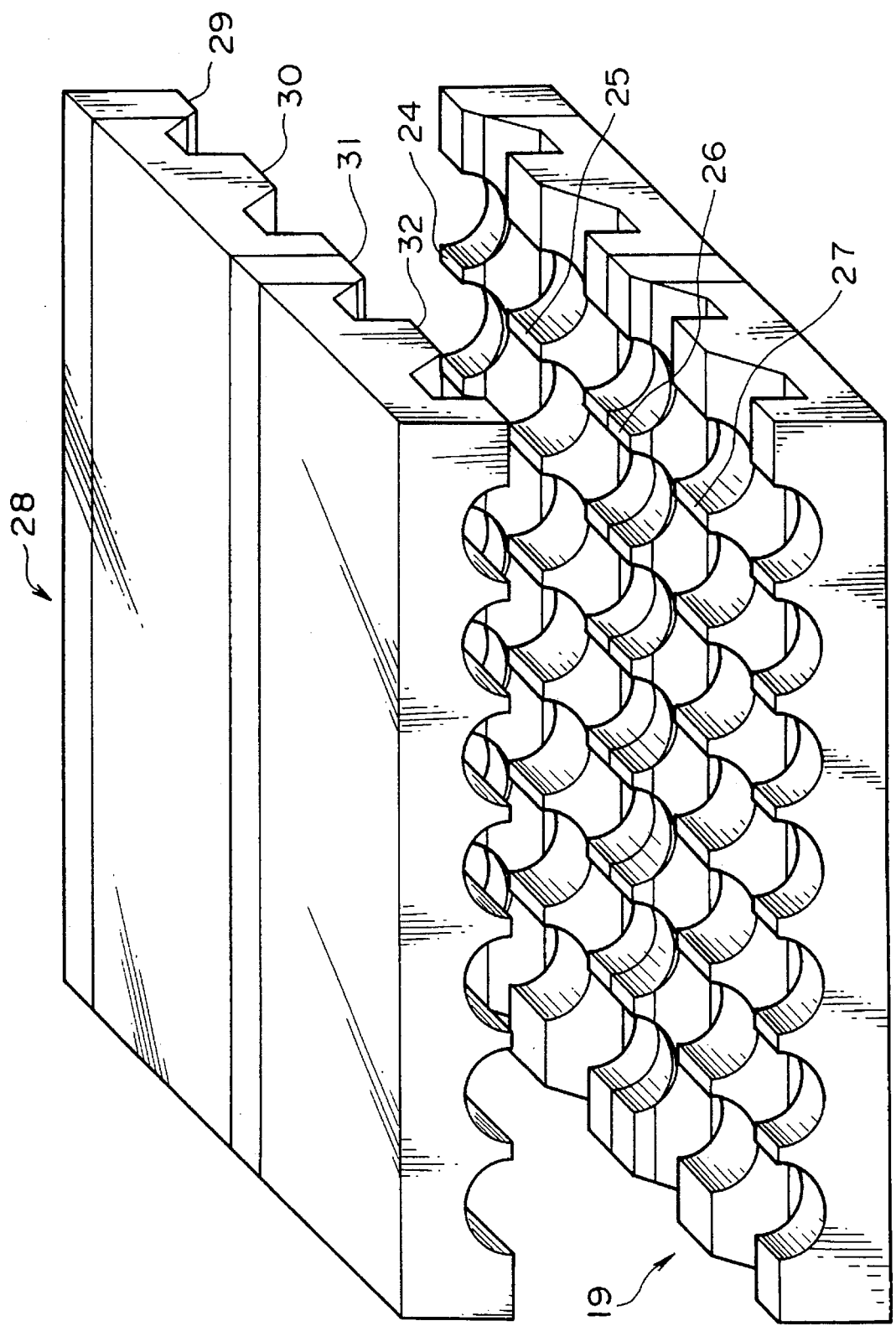
Figure 6:
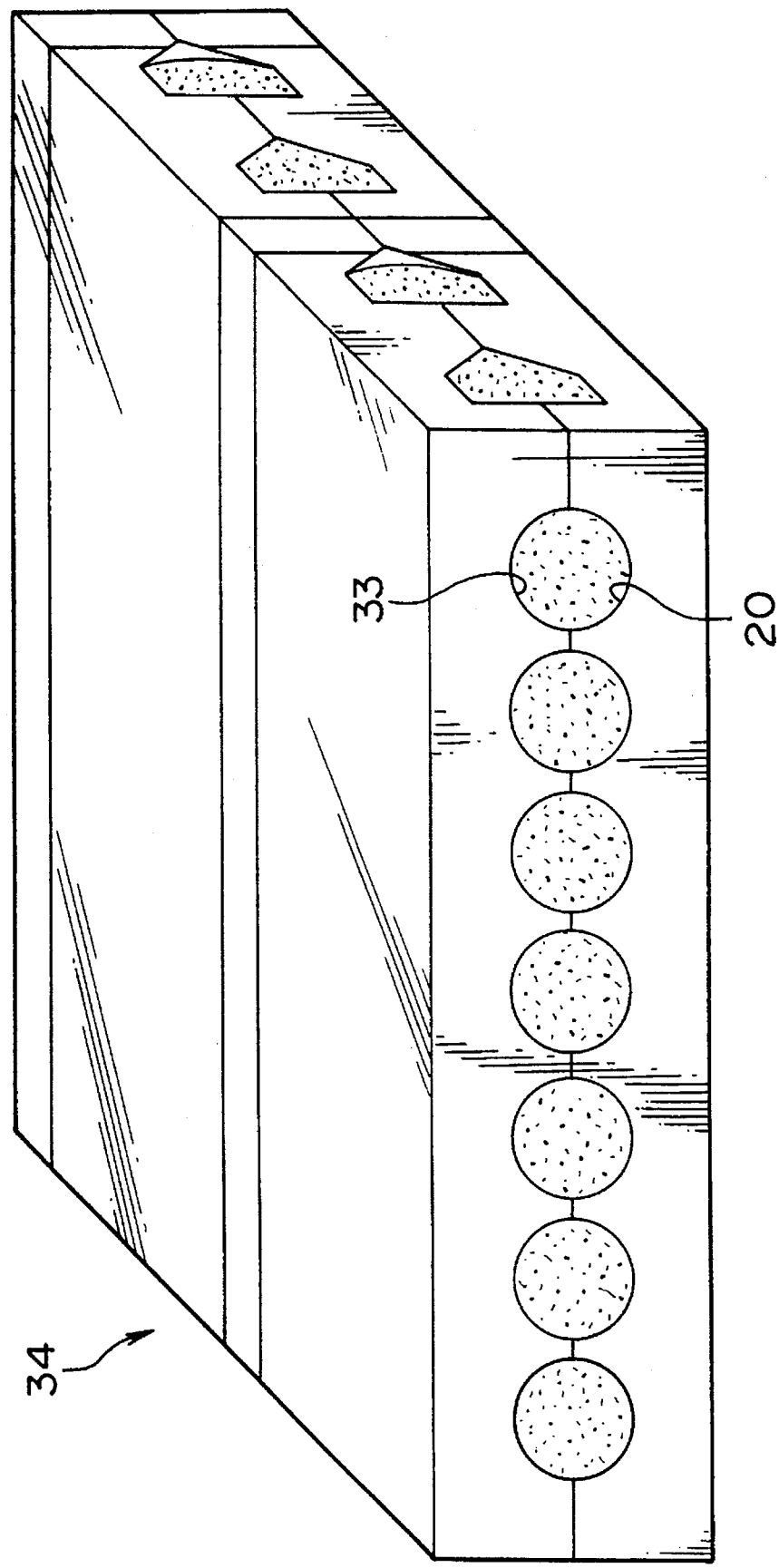
FIG. 6 is a perspective view showing a completed magnetic head block.

A bonded ferrite block 28, shaped similarly to the bonded ferrite block 19, is formed by the process steps similar to those for the bonded ferrite block 19, as shown in FIG. 5. The bonded ferrite blocks 19, 28 are abutted and stacked together so that the front gap forming surface 24, back gap forming surface 25, front gap forming surface 28 and the back gap forming surface 27 of the block 19 are coincident with a front gap forming surface 29, a back gap forming surface 30, a front gap forming surface 31 and a back gap forming surface 32 of the bonded ferrite block 28, respectively. A gap spacer, not shown, having a thickness corresponding to a pre-set gap length, is interposed in the abutting portions except a gap forming region.

Figure 8:
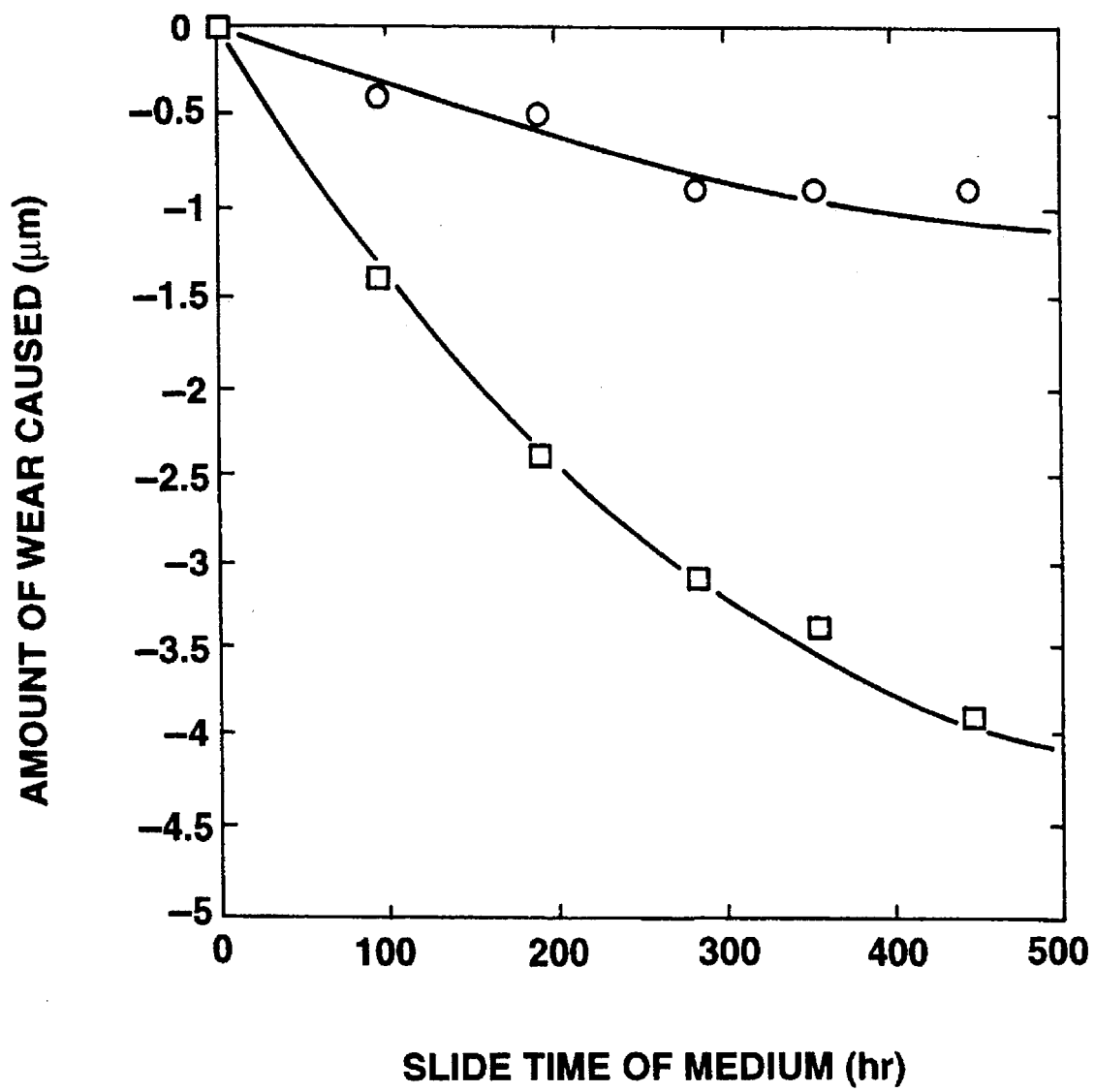
FIG. 8 is a graph showing changes in the amount of the abrasion caused in the magnetic head as plotted against the medium rubbing time for the magnetic head of the embodiment 1 and a conventional magnetic head.

Fused glass rods, not shown, are interposed in the gap between the winding slots in the bonded ferrite blocks 19 and 28, and in the gap between the glass slots and fused with the bonded ferrite blocks 19 and 28 pressed together in order to charge the fused glass between the blocks 19, 28 to effect glass bonding. A magnetic head block 34 as shown in FIG. 8 is now produced. At this time, the fused glass is charged in the track width control grooves 20, 33 for providing contact characteristics of the magnetic head with respect to the recording medium proper to the fused glass.

Figure 7:
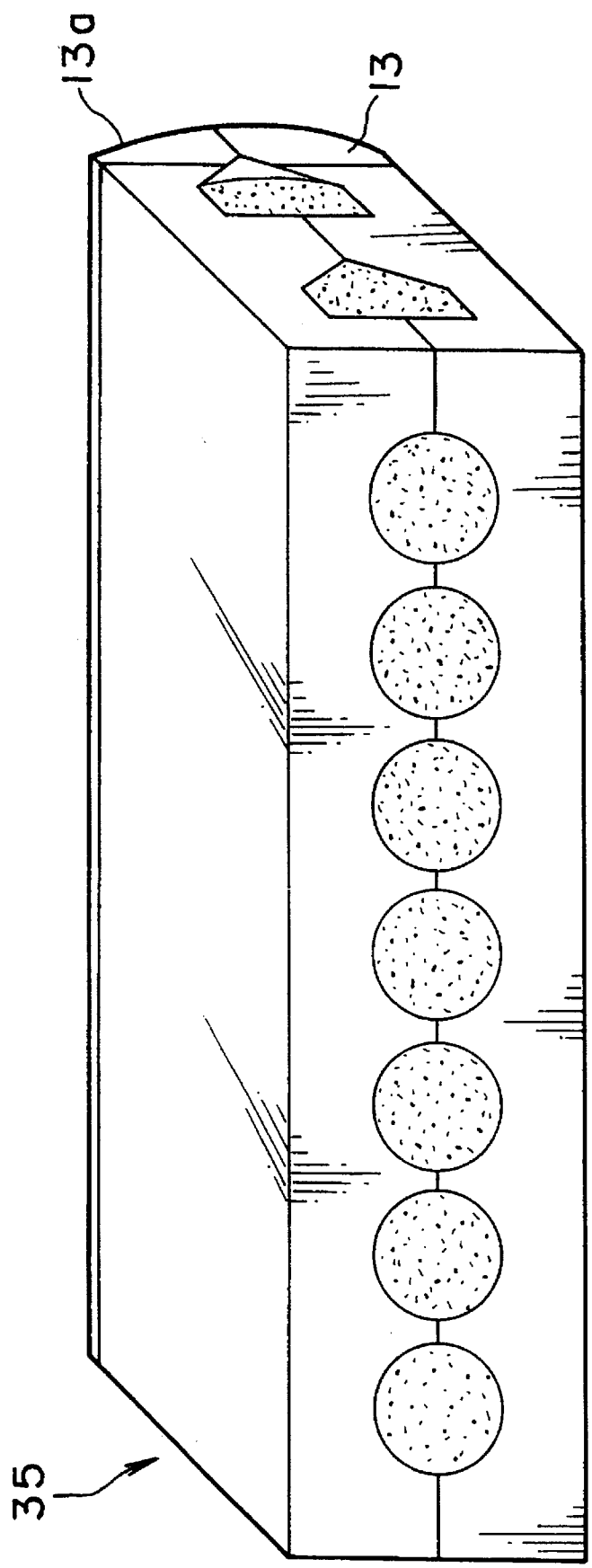
FIG. 7 is a perspective view showing a completed magnetic head chip block.

The magnetic head block 34 is severed into a number of magnetic head chips blocks, one of which is shown at 35 in FIG. 7. The medium facing surface 13a is ground to a cylindrical surface. The magnetic chip block 35 is further severed into plural magnetic head chips, and the winding guide slots 11, 12 are cut in the lateral sides of each magnetic head chip to complete the magnetic head shown in FIG. 1.

The magnetic head of the present embodiment, produced as described above, and a conventional β-type ferrite head, the magnetic core of which is formed of β single-crystal ferrite, were checked as to their abrasion resistance and electro-magnetic conversion characteristics.

For evaluating the abrasion resistance, each magnetic head was loaded on a 8-mm VTR, and comparative measurements were made on the amounts of wear caused to the magnetic heads with respect to the rubbing time of the recording medium. The results are shown in FIG. 8. The results of the magnetic head of the present embodiment and those of the conventional β ferrite magnetic head are indicated by 0 and □, respectively. It may be seen from FIG. 8 that, since the medium facing surface of the present magnetic head is (100), it has excellent abrasion resistance, such that, with the medium rubbing time of 450 hours, the abrasion resistance is four times that of the conventional magnetic head.

Figure 9:
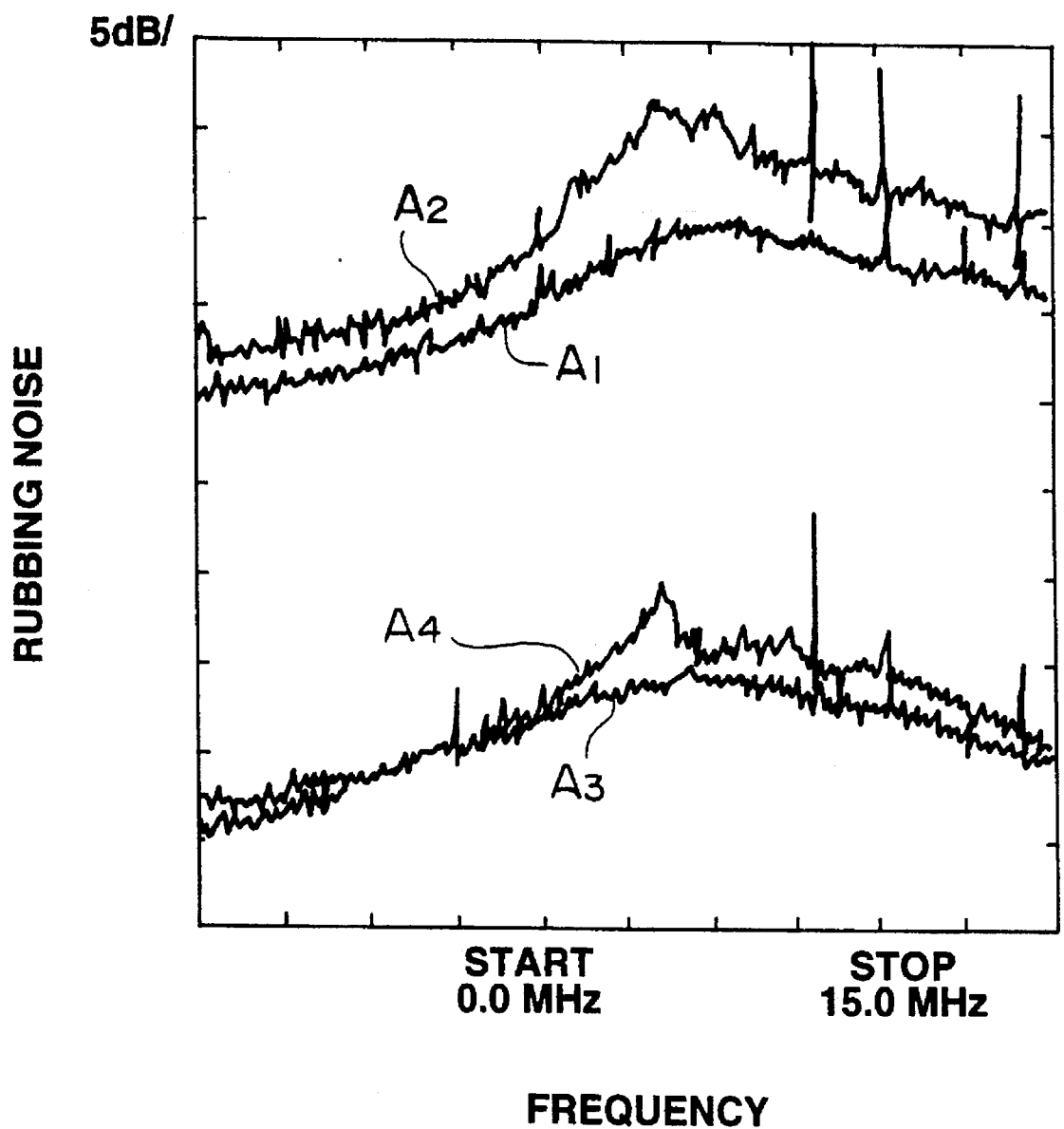
FIG. 9 is a graph showing changes, with respect to the frequency, in the rubbing noise produced in the magnetic head of the embodiment 1 and a conventional magnetic head.

In evaluating the electro-magnetic conversion characteristics, comparative measurements were made of the rubbing noise with respect to the frequency of each magnetic head. Among the causes of the deterioration of the electro-magnetic conversion characteristics, there are possibly the plane orientation of the single-crystal ferrite of the magnetic head and the oscillations experienced by the single-crystal ferrite. With the magnetic head of the present embodiment, deterioration in the electro-magnetic characteristics due to oscillation noises caused by the oscillations experienced by the ferrite is feared, rather than that due to the plane orientation of the ferrite. With this in view, measurements were made of the rubbing noise of each magnetic head with respect to the frequency. The results are shown in FIG. 9, in which $A_1$, $A_2$, $A_3$ and $A_4$ represent the rubbing noise of the present magnetic head, the amplifier noise of the present magnetic head, the rubbing noise of the conventional magnetic head and the amplifier noise of the conventional magnetic head, respectively. It may be seen from this that the magnetic head of the present magnetic head is lower in the rubbing noise and higher in electro-magnetic conversion characteristics than the conventional magnetic head. The reason is possibly that the major porions of the magnetic core of the magnetic head of the present embodiment is formed of poly-crystal ferrite. Consequently, with the magnetic head of the present embodiment, since the medium facing surface of the magnetic core is formed of single-crystal ferrite, with the remaining portion thereof being formed of poly-crystal ferrite, and the medium facing top surface and the abutting vertical surface of the magnetic core at the gap being the {100} plane and another {100} plane of the single-crystal ferrite, there is little risk of abrasion due to the rubbing of the recording medium. On the other hand, the deterioration of the electro-magnetic conversion characteristics due to the crystal orientation of the ferrite is minimized and the rubbing noise is scarcely produced, as a result of which good abrasion resistance and superior electro-magnetic conversion characteristics may be achieved.

Embodiment 2

The present embodiment is directed to the TSS head in which an inclined cut-out groove is formed between vertical abutment surfaces of the magnetic core and a thin magnetic metal film is formed at a pre-set angle with respect to the abutment surfaces, with a magnetic gap being formed by abutment of the thin magnetic metal films of two magnetic cores.

Figure 10:
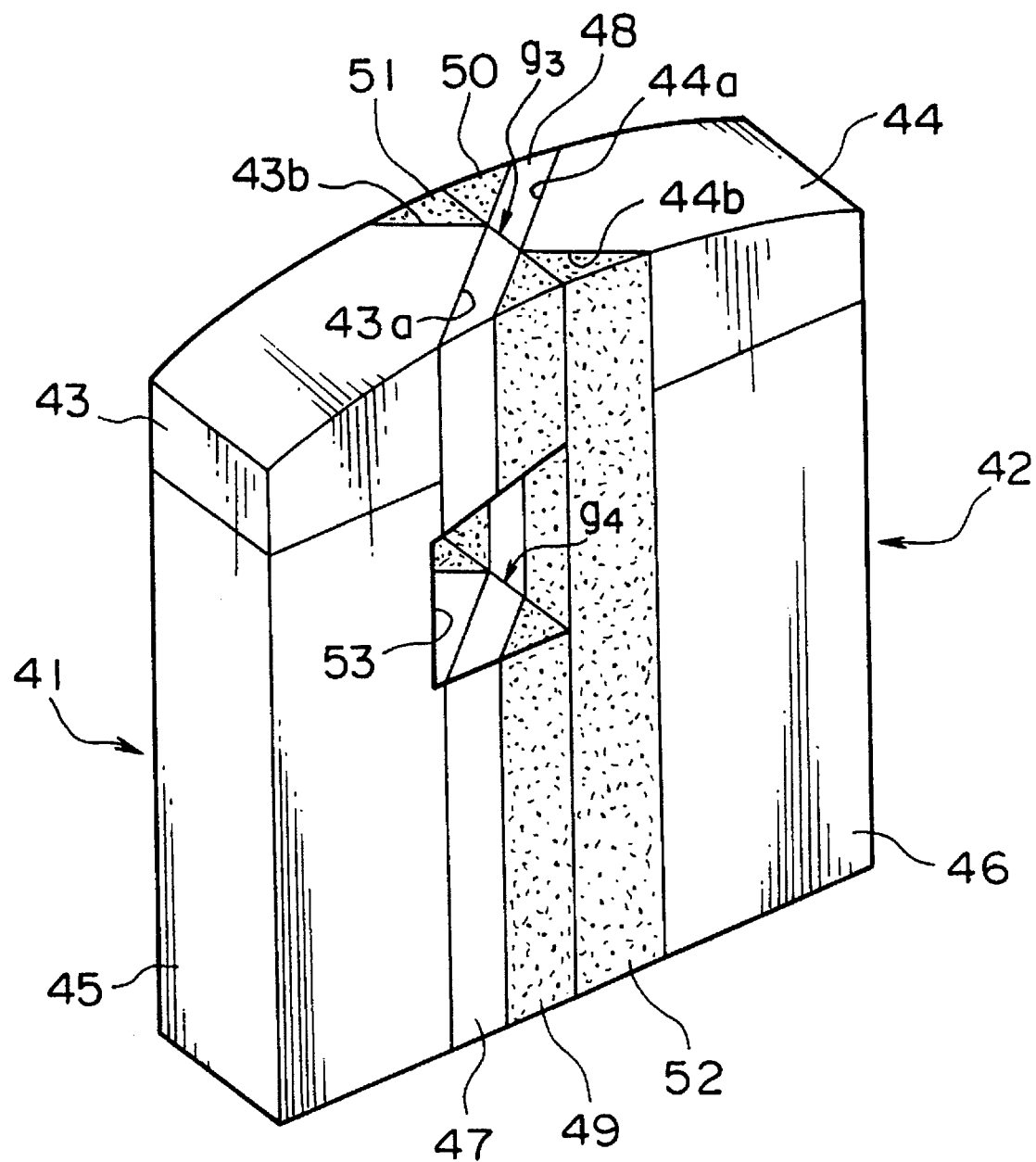
FIG. 10 is a perspective view showing a magnetic head of the embodiment 2 according to the present invention.

The magnetic head of the present embodiment is made up of a pair of magnetic cores 41 and 42 abutted and connected to each other with a magnetic gap $g_3$ (front gap) and a magnetic gap $g_4$ (back gap) in-between, as shown in FIG. 10. On inclined surfaces 43a, 44a, formed by obliquely cutting the connecting surfaces of the magnetic cores 41, 42, thin magnetic metal films 47, 48 of, for example, a Fe—Al—Si alloy, are deposited from the front gap surface up to the back gap surface. These magnetic cores 41, 42 are abutted together with a gap spacer, such as $SiO_2$, in-between, so that the abutment surface of the thin magnetic metal films 47, 48 affords the magnetic gaps $g_3$ and $g_4$ each having a pre-set track width. Fused glass, shown at 49, 50, 51 and 52, is charged in a molten state on the thin magnetic metal films 47, 48 and in the track width control grooves 43b, 44b. A coil winding slot 59 for placing a coil, not shown, is formed in one of the magnetic cores.

With the top magnetic head of the present embodiment, the medium facing surfaces of the magnetic cores 41, 42 are formed of single-crystal ferrites 43, 44, with the remaining portions of the magnetic ores being formed of poly-crystal ferrites 45, 46, respectively. The single-crystal ferrite is produced by slicing a starting ferrite block so that the medium facing top surface and the abutting vertical surface at the gap are {100} and {100} planes, respectively.

The magnetic head of the present embodiment may be prepared in accordance with the method for preparing the magnetic head of the embodiment 1, using a single-crystal ferrite block and a poly-crystal ferrite block, similar to those used for the preparation of the magnetic head of the embodiment 1, as the substrates.

With the magnetic head of the present embodiment, in which an inclined cut-out groove (defined at inclined surfaces 43a, 43b) is formed at the abutment surfaces of the magnetic core, and the thin magnetic metal film is formed at a pre-set angle with respect to the vertical abutment surfaces, with the thin magnetic metal film being abutted together to define a magnetic head, since the medium facing top surface of the magnetic core are formed of single-crystal ferrite, with the remaining portions thereof being formed of poly-crystal ferrite, and the medium facing top surfaces and the abutting vertical surfaces of the magnetic core at the gap being the {100} plane and another {100} plane of the single-crystal ferrite, respectively, there is little risk of abrasion due to the rubbing of the recording medium. On the other hand, the deterioration of the electro-magnetic conversion characteristics due to the crystal orientation of the ferrite is minimized, and the rubbing noise is scarcely produced, as a result of which good abrasion resistance and superior electro-magnetic conversion characteristics may be achieved.

Embodiment 3

The present embodiment is directed to the MIG magnetic head in which thin magnetic metal films are formed on abutment surfaces of the magnetic cores and these thin magnetic metal films are abutted together to form a magnetic gap.

Figure 11:
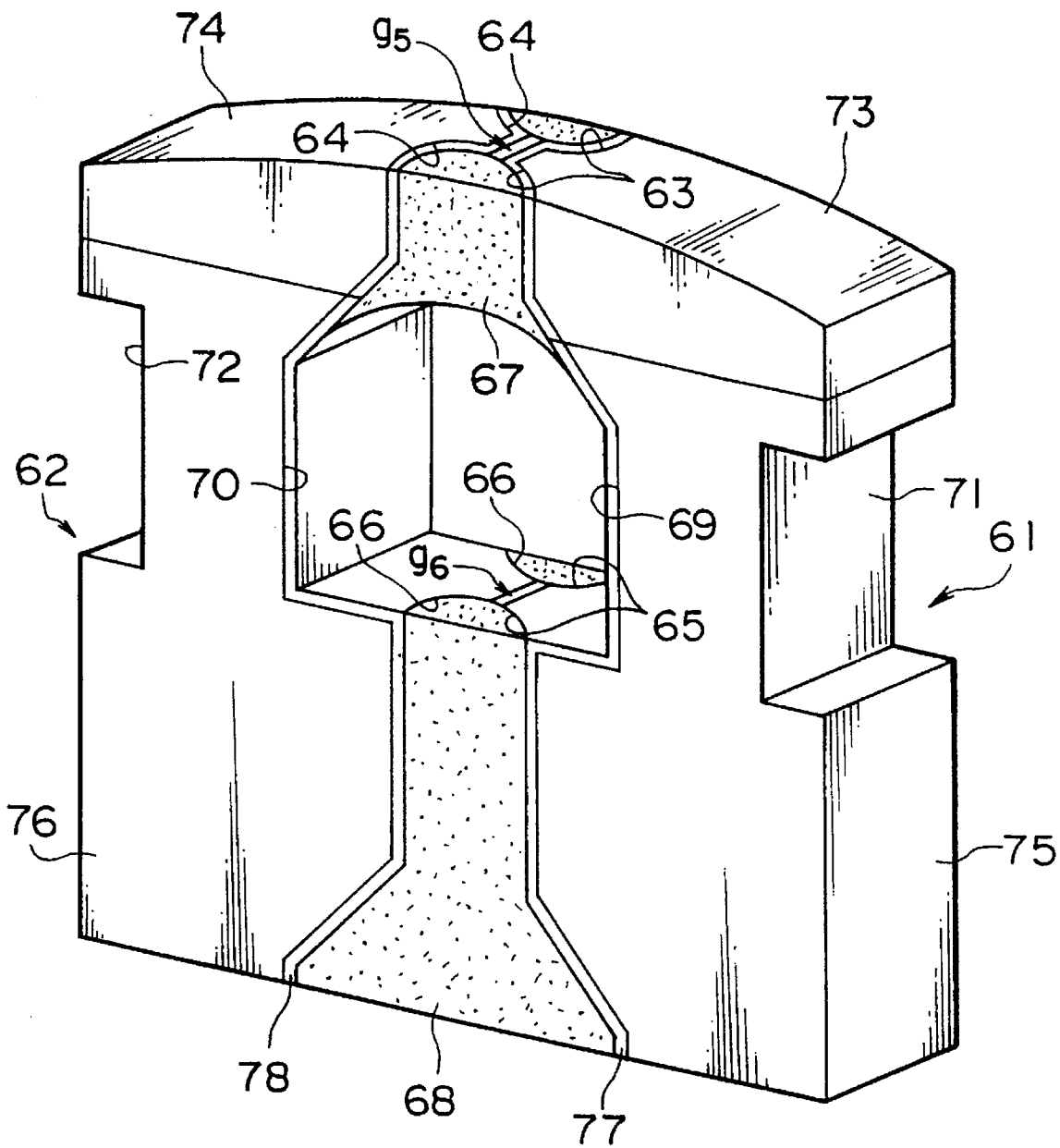
FIG. 11 is a perspective view showing a magnetic head of the embodiment 3 according to the present invention.
Figure 12:
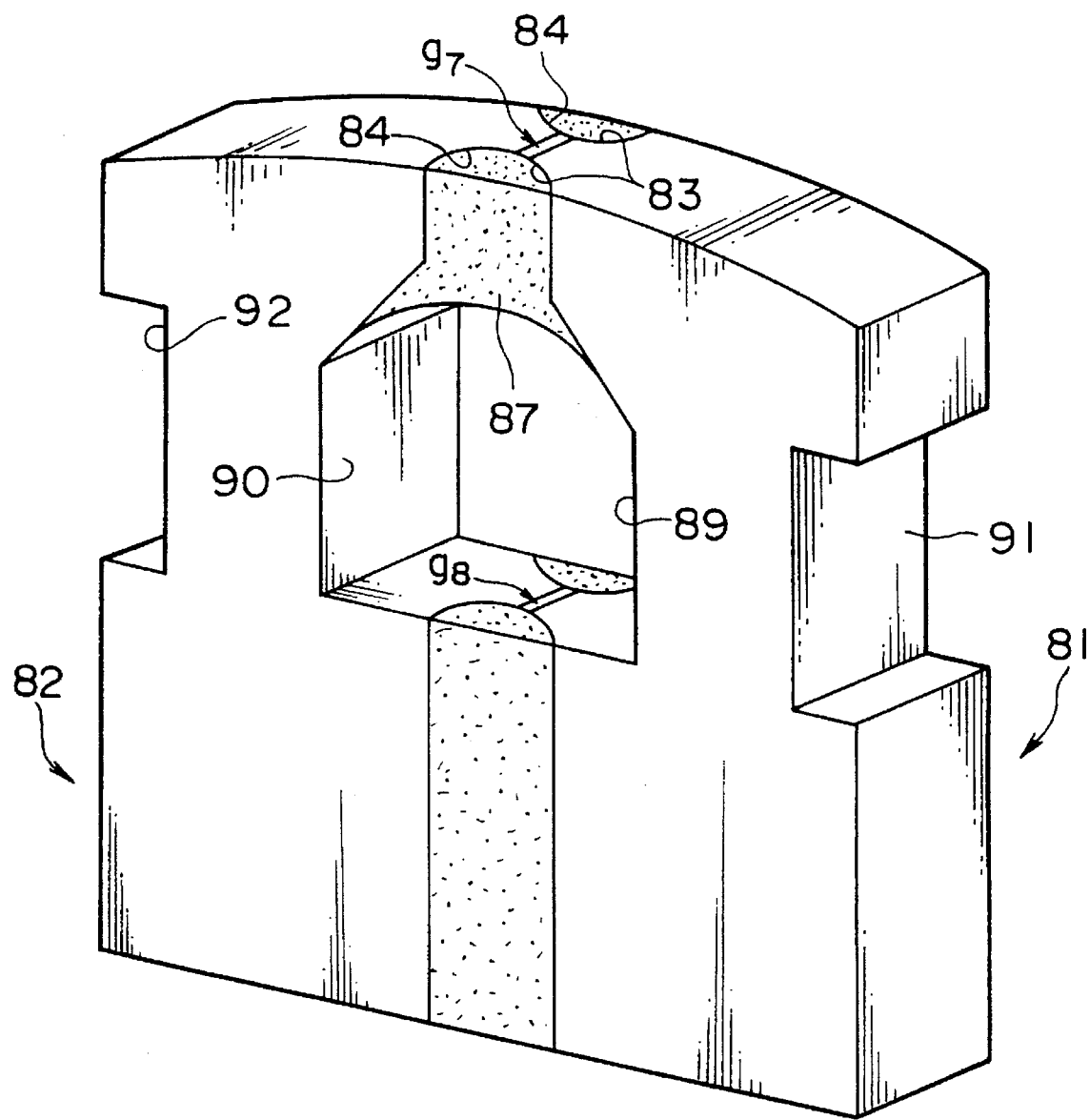
FIG. 12 is a perspective view showing a conventional magnetic head.
Figure 13:
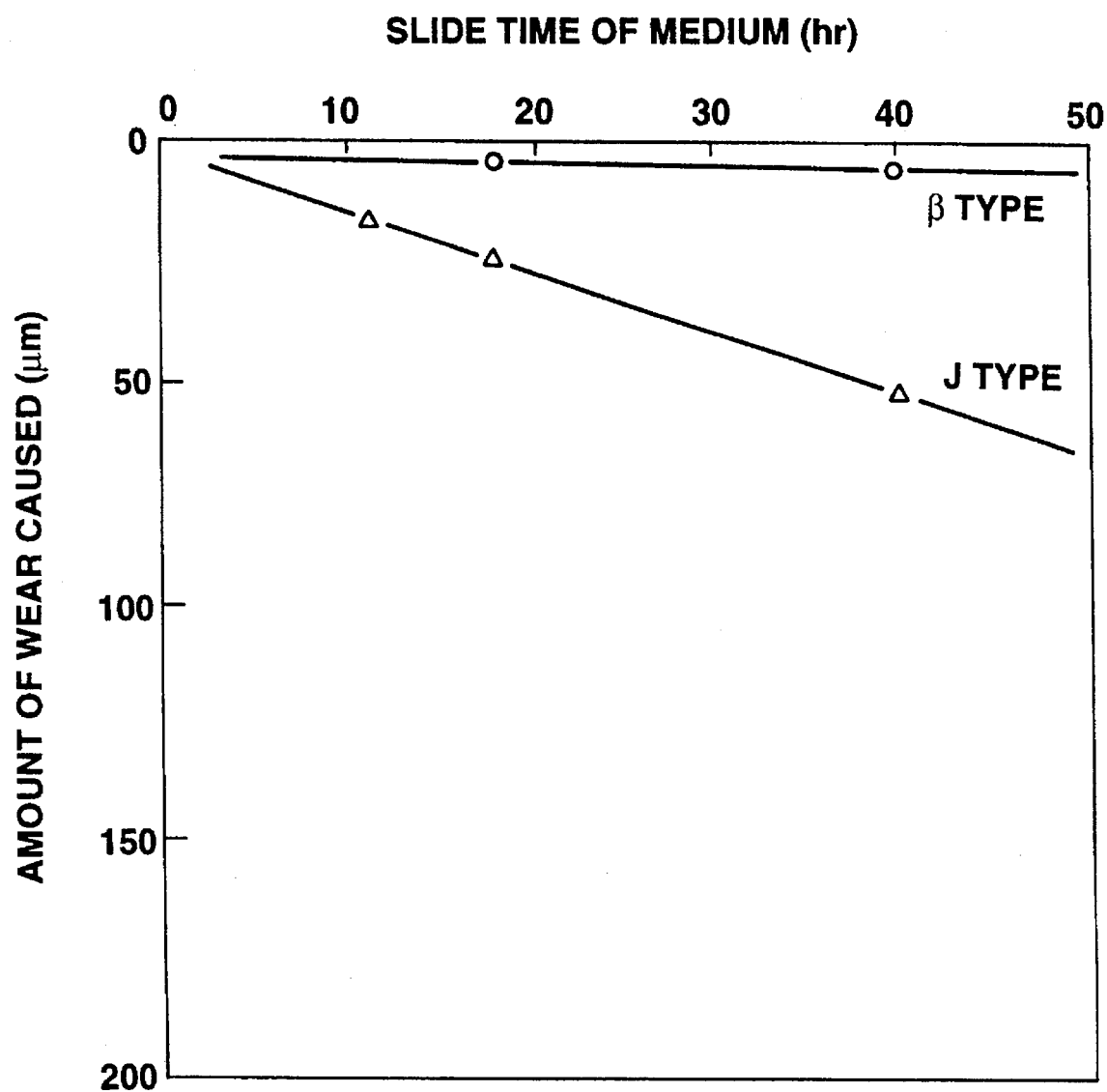
FIG. 13 is a graph showing abrasion resistance characteristics of the conventional magnetic head.

The magnetic head of the present embodiment is made up of a pair of magnetic cores 61 and 62 abutted and connected to each other with a magnetic gap $g_5$ (front gap) and a magnetic gap $g_6$ (back gap) in-between, as shown in FIG. 11. Meanwhile, track width suppression grooves 63, 64 for controlling the track width of the magnetic gap $g_5$ and track width suppression grooves 65, 66 for controlling the track width of the magnetic gap $g_6$ are formed in the abutment surfaces of the magnetic cores 61 and 62. There are also formed coil winding slots 69, 70. Thin magnetic metal films 77, 78 are formed on the abutment surfaces of the magnetic cores 61, 62 to follow the shape of the abutment surfaces. Fused glass is charged in molten state between the track width suppression grooves 63, 64 and the track width suppression grooves 65, 66 for connecting the magnetic cores 61 and 62 together. There is no limitation to the fused glass if it is such fused glass as is commonly employed for the manufacture of the magnetic heads. Coil winding guide slots 11, 12 are formed in the lateral sides of the magnetic cores 61 and 62, respectively. Coils, not shown, are wound across the winding slots 11, 12 and the guide slots 9, 10.

With the magnetic head of the present embodiment, the medium facing top surfaces of the magnetic cores 61 and 62 are formed by single-crystal ferrites 73, 74, with the remaining portions of the magnetic cores 61 and 62 being formed of poly-crystal ferrites 15, 16. The single-crystal ferrite is sliced so that the medium facing top surface is the (100) plane and the abutting vertical surface at the gap is the (100) plane.

The magnetic head of the present embodiment may be prepared in accordance with the method for preparing the conventional MIG head, using a single-crystal ferrite block and a poly-crystal ferrite block, similar to those used for the preparation of the magnetic head of the embodiment 1, as the substrates.

With the magnetic head of the present embodiment, in which thin magnetic metal films are formed on the abutment surfaces of the magnetic cores and the thin magnetic metal films of two magnetic cores are abutted together to define a magnetic head, since the top medium facing surface of the magnetic core is formed of single-crystal ferrite, with the remaining portion thereof being formed of poly-crystal ferrite, and the medium facing top vertical surface and the abutting surface of the magnetic core at the gap being the {100} plane and another {100} plane of the single-crystal ferrite, respectively, there is little risk of abrasion due to the rubbing of the recording medium. On the other hand, since the deterioration of the electro-magnetic conversion characteristics due to the crystal orientation of the ferrite is minimized and the rubbing noise is scarcely produced, good abrasion resistance and superior electro-magnetic conversion characteristics may be achieved.

Although various minor changes and modifications might be proposed by those skilled in the art, it will be understood that I wish to include within the claims of the patent warranted hereon all such changes and modifications as reasonably come within my contribution to the art.

What is claimed is:

1. A magnetic head having a pair of magnetic cores abutted together for defining a magnetic gap therebetween, wherein the improvement comprises:

top medium facing surfaces of the magnetic cores being formed of single-crystal ferrite and remaining portions of the magnetic cores being formed of poly-crystal ferrite, with the top medium facing surfaces being a {100} plane, and vertical abutment surfaces of the magnetic core at the gap being another {100} plane of the single-crystal ferrite.

2. The magnetic head as claimed in claim 1 wherein thin magnetic metal films are formed on said vertical abutment surfaces of the magnetic cores at the magnetic gap, and the magnetic gap being formed by abutting the magnetic metal films together.

3. The magnetic head as claimed in claim 1 wherein a cut-out groove is formed passing through the vertical abutment surfaces of the magnetic cores at the gap at a pre-set angle with respect to the vertical abutment surfaces and thin magnetic metal films are formed in said groove, said thin magnetic metal films being abutted together to form the magnetic gap.

4. A magnetic core arrangement for a magnetic head, comprising:

a pair of magnetic cores abutting together and defining a magnetic gap therebetween;

said magnetic cores each comprising a lower magnetic core portion formed of poly-crystal ferrite and a layer on top of each of the magnetic core portions formed of single-crystal ferrite, and wherein the magnetic gap is formed between the layers of single-crystal ferrite; and a medium facing top surface of the single-crystal ferrite layers being a {100} plane and vertical abutment surfaces of the layers at which said magnetic gap is formed being another {100} plane of the single-crystal ferrite layers.

* * * * *